United States Patent [19]
Culbertson et al.

[11] 3,970,217
[45] July 20, 1976

[54] COIN-OPERABLE PACKAGED DIAPER DISPENSING MACHINE

[75] Inventors: William E. Culbertson; Linda R. Culbertson, both of Aurora, Ill.

[73] Assignee: Lawrence Peska Associates, Inc., New York, N.Y. ; a part interest

[22] Filed: Dec. 23, 1975

[21] Appl. No.: 643,789

[52] U.S. Cl................................. 221/80; 198/158
[51] Int. Cl.²...................................... B65G 47/38
[58] Field of Search .................. 221/80, 81, 77, 78, 221/90, 86, 76, 82, 83, 124, 125, 131, 84, 85; 198/155, 158

[56] References Cited
UNITED STATES PATENTS

| | | | |
|---|---|---|---|
| 1,517,066 | 11/1924 | Hope | 221/86 |
| 3,765,566 | 10/1973 | Dasher | 221/80 X |

*Primary Examiner*—Stanley H. Tollberg
*Attorney, Agent, or Firm*—Joel Halpern

[57] ABSTRACT

A coin-operable automatic packaged diaper dispenser has a plurality of endless conveyors mounted rotatably within a housing. Each of the conveyors has a plurality of diaper storage shelves mounted thereon in pivotal manner. The conveyors are rotatable incrementally by an electric motor controlled by a coin-operable switch. A deflector stud is mounted within the housing at a location where it is engageable serially with each of the shelves as they approach a diaper discharge station to thereby effect pivotal movement of the shelf to discharge the packaged diaper to a delivery opening in a wall of the housing. When the shelf reaches the discharge station the stud disengages from the shelf and a return spring restores the shelf to its original position.

3 Claims, 3 Drawing Figures

COIN-OPERABLE PACKAGED DIAPER DISPENSING MACHINE

BACKGROUND OF THE INVENTION

The present invention relates to coin-operable dispensing machines and more particularly to a diaper dispensing machine which is motorized.

Coin-operable dispensing machines have been in wide use heretofore. However, they have generally been rather complex structurally and frequently become easily jammed with the article to be dispensed. Also, it has been possible to insert a wire or the like into the machine and extract an article without having to insert a coin. One type of prior vending machine for pads of paper or the like is shown in U.S. Pat. No. 3,228,554 issued Jan. 11, 1966 to E. P. Huffman.

SUMMARY OF THE INVENTION

It is one object of the present invention to provide an automatic diaper dispensing machine which is coin-operable and which affords increased security against tampering.

Another object of the invention is to provide an automatic coin-operable diaper dispensing machine of simple construction capable of individualized storage of the diapers so as to maintain the integrity of the passage and preserve the sanitary state of the diapers.

Other objects and advantages of the invention will become readily apparent from the following description of the invention.

According to the present invention there is provided a coin-operable automatic packaged diaper dispenser comprising:

a housing having a packaged diaper delivery opening in one of the walls thereof;

a plurality of endless conveyors drivable by a common shaft mounted rotatably within the housing;

a plurality of diaper storage shelves pivotably carried by each of the conveyors in spaced relation;

deflector means mounted fixedly within the housing above said delivery opening in the path of movement of the shelves and engageable serially with the rear of each of the shelves to thereby effect pivotal movement of the shelf and the discharge of the packaged diaper stored thereon to the delivery opening;

spring means being operably connected with each of the shelves for returning the pivoted shelf to its original position;

and a coin-actuable electric motor operably connected to the drive shaft for incrementally moving a selected conveyor to thereby move a shelf thereon to a diaper discharge station adjacent the delivery opening.

BRIEF DESCRIPTION OF THE DRAWINGS

In order that the invention may be more fully comprehended it will now be described, by way of example, with reference to the accompanying drawings in which.

DETAILED DESCRIPTION OF THE INVENTION

Figure 1:
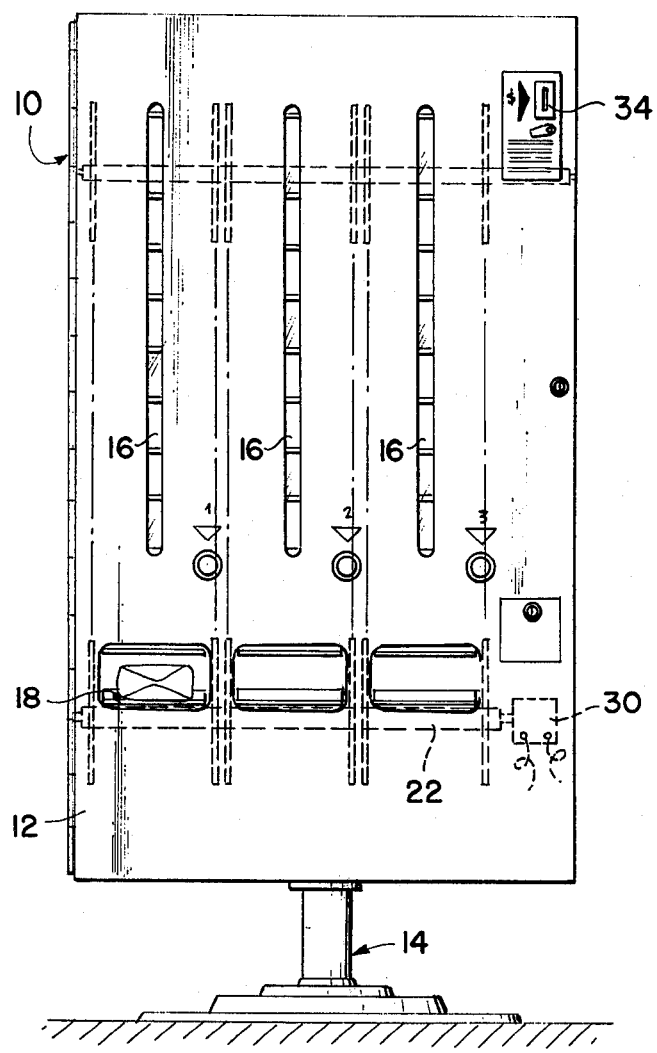
FIG. 1 is a front elevational view of the packaged diaper dispensing machine of the invention.

Referring to the drawings there is shown generally, by reference numeral 10, a coin-operable automatic packaged diaper dispensing machine. The machine includes a housing 12 which may be positionable upon a support base 14 so that a degree of portability is provided. The front wall of the machine is given a series of transparent windows 16 which afford visual access to the interior of the machine to determine whether or not the machine requires refilling. At least one diaper opening 18 is provided in the front wall. As shown there are three such openings, one adjacent the discharge station of each conveyor within the housing.

A plurality of endless conveyors 20 are mounted rotatably within the housing and are desirably driven by a common motor-driven shaft 22. Three of such conveyors affords an opportunity to dispense diapers in three different sizes, i.e., for infants, medium size and for toddlers. Each of the conveyors carries a plurality of storage shelves 24 which extend in a direction substantially perpendicular to the path of movement of the conveyor. They are pivotably mounted on the conveyor such that as the conveyor is driven through its rotative path and the shelves serially approach the discharge station indicated by letter S in FIG. 2 the rear of the shelf engages with a deflector stud 26 mounted within the housing and the shelf is thereby shifted or pivoted to the inclined position shown in FIG. 2. The packaged diaper will slide from the shelf, which thus serves as a ramp, into the delivery opening. At this point in the travel of the conveyor the next shelf will be located a sufficient distance behind the discharging shelf as to make it physically substantially impossible for a person to reach into the housing either by wire or by hand to pilfer a package. This is made possible by locating the deflector stud at an elevation such that the discharging shelf begins to pivot and discharge at an elevation above the delivery opening. This feature is considered to be significant because it enables the positioning of the shelves at optimum distances so as to maximize the storage capacity of the machine while providing also maximum security against pilferage. A return spring 28 is provided for each shelf to restore the shelf to its original position prependicular to the line of movement of the conveyor as soon as the shelf reaches the discharge station S. At such point the shelf so obstructs the delivery opening that there is insufficient clearance between the shelf and the top of the delivery opening for unauthorized withdrawal of the diaper package from the next shelf which has not yet descended to the elevation level where pivoting commences. A stop 29 is located on the conveyor adjacent the upper surface of each shelf and serves to limit the rotational movement of the shelf under the influence of spring 28.

Figure 2:
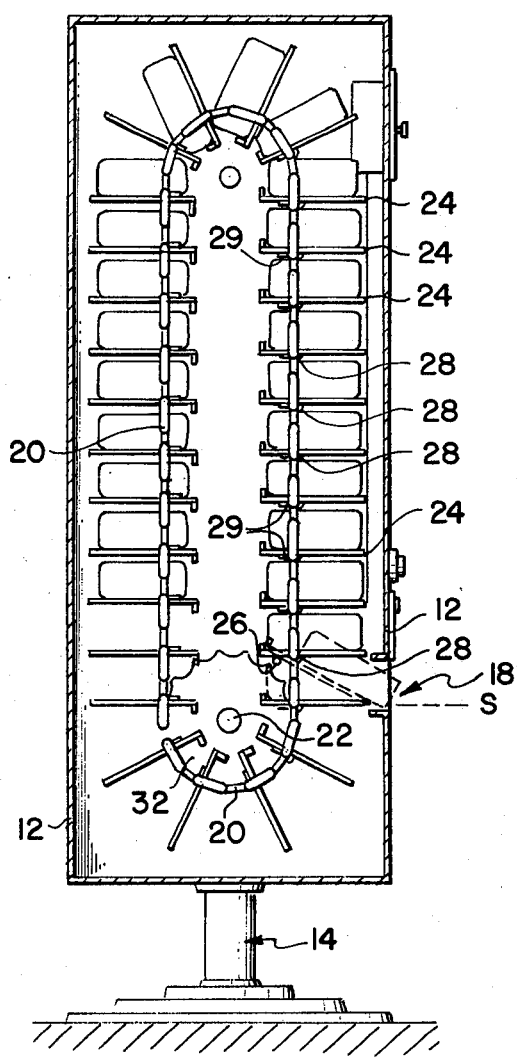
FIG. 2 is a side view of the machine shown in FIG. 1 with the side wall removed.

A motor 30 is desirably positioned within the lower portion of the housing and is operatively connected to the drive shaft 22. The drive shaft may be engageable with the conveyors in a conventional manner for driving same. As shown in FIG. 2 a sprocket wheel 32 for each of the conveyors may be carried by the shaft. It will be understood, however, that belt and pulley arrangements or the like may be employed with substantially equal effectiveness.

Figure 3:
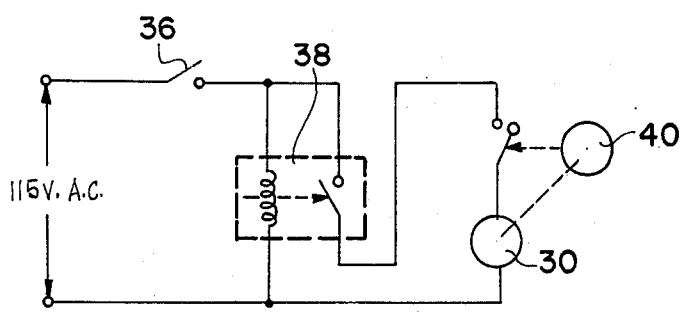
FIG. 3 is a schematic electrical diagram of a suitable motor control circuit.

As shown schematically by FIG. 3, the motor control circuit is energized by the insertion of a coin into slot 34 so as to close switch 36 and activate the relay mechanism 38. Cam means 40 is positioned within the housing and is cooperable with the switch 36 so as to switch off the motor after the conveyor has been moved a predetermined amount. Such amount will be that which is sufficient to move a storage shelf from a location above the delivery opening to the discharge station S.

From the foregoing it will be seen that a coin-operable packaged diaper dispensing machine has been provided which is simple in construction and, therefore, relatively inexpensive to manufacture, which affords maximum security against pilferage, and which maintains the packages in stored positions which insure the integrity of each package.

We claim:

1. A coin-operable automatic packaged diaper dispenser comprising:

a housing having a packaged diaper delivery opening in one of the walls thereof;

a plurality of endless conveyors drivable by a common shaft mounted rotatably within said housing;

a plurality of diaper storage shelves pivotably carried by each of said conveyors in spaced relation;

deflector means mounted fixedly within said housing above said delivery opening in the path of movement of said shelves and engageable serially with the rear of each of said shelves to thereby effect pivotal movement of the shelf and the discharge of the packaged diaper stored thereon to said delivery opening;

spring means being operably connected with each of said shelves for returning the pivoted shelf to it original position;

and a coin-actuable electric motor operably connected to said drive shaft for incrementally moving a selected conveyor to thereby move a shelf thereon to a diaper discharge station adjacent said delivery opening.

2. An automatic diaper dispenser according to claim 1, wherein cam means is positioned within said housing, said cam means being engageable with switch means in the motor circuit for switching off the motor when it has moved said conveyor a predetermined amount.

3. An automatic diaper dispenser according to claim 1, wherein sprocket wheels are carried by said drive shaft for engagement respectively with said conveyors for the driving of same.

* * * * *